United States Patent [19]

Milleville

[11] 4,413,710
[45] Nov. 8, 1983

[54] RETRACTABLE PANTOGRAPH FOR DOWNWARD WITHDRAWAL IN THE EVENT OF AN ABNORMAL FRONTAL LOAD

[75] Inventor: Andre Milleville, Ezanville, France
[73] Assignee: Faiveley S.A., Saint Ouen, France
[21] Appl. No.: 272,343
[22] Filed: Jun. 10, 1981

[30] Foreign Application Priority Data

Jun. 18, 1980 [FR] France ................ 80 13487

[51] Int. Cl.³ .................................. B60L 5/12
[52] U.S. Cl. ........................... 191/70; 191/88
[58] Field of Search ..................... 191/88, 89, 70

[56] References Cited

U.S. PATENT DOCUMENTS 2,238,418 4/1941 Grant .................. 191/88 X

FOREIGN PATENT DOCUMENTS

542071 12/1931 Fed. Rep. of Germany .
2909855 9/1979 Fed. Rep. of Germany .
2066515 8/1971 France .
120422 3/1926 Switzerland .
542067 11/1973 Switzerland .
539793 3/1977 U.S.S.R. .................... 191/88

Primary Examiner—Richard A. Schacher
Attorney, Agent, or Firm—Young & Thompson

[57] ABSTRACT

A movable structure for supporting a current-collector bow is pivotally mounted on a frame and lifted by means of a spring attached to the structure and to the frame. Upper members of the bow support structure permit displacement of the bow independently of the structure. Hook-engagement means or valve units are provided for neutralizing the lifting spring and transmission means are provided for connecting the bow-displacement means to the spring-neutralizing means. A load limiter inhibits the bow-displacement means below a predetermined load threshold value and releases the bow above this value.

7 Claims, 13 Drawing Figures

FIG_1

FIG_2

FIG_5

FIG_8

FIG_9

FIG_11

FIG_12

RETRACTABLE PANTOGRAPH FOR DOWNWARD WITHDRAWAL IN THE EVENT OF AN ABNORMAL FRONTAL LOAD

This invention relates to a pantograph which is automatically retractable in the event of an abnormal frontal load. Said pantograph comprises a current-collector bow mounted at the top of a movable structure which is pivotally mounted on a frame, at least one spring for lifting the movable structure, said spring being attached to said movable structure and to said frame, means for permitting displacement of the bow independently of the movable structure, means for neutralizing the lifting spring, and transmission means for coupling the bow-displacement means to the means for neutralizing the lifting spring.

These elements are already known and have been described in Swiss Pat. No. 120,422. As disclosed in this specification, the current-collector bow is capable of pivotal displacement about an axis and is accompanied in this displacement by a fork. A ball secured at the end of a control cable which forms part of the transmission means, is located between the arms of the fork.

Under normal service conditions, opppositely-acting springs maintain the bow in a substantially vertical position. Certain oscillations of the bow are nevertheless permitted, such oscillations being limited on each side as one of the fork arms comes into contact with the ball.

If the bow passes beyond the angle of inclination corresponding to the contact established between the fork arm and the ball, the displacement of the fork is in that case accompanied by the ball which exerts a tractive force on the control cable. The result thereby achieved is to drain the hydraulic motor which normally produces compensation of the lowering springs and at the same time to release the lowering spring which exerts a higher force than the lifting spring when it is not compressed by the piston of the hydraulic motor.

The use of this pantograph of known design is now steadily declining since it suffers from a large number of drawbacks. In the first place, the current-collector bow is endowed with a certain freedom of inclination. During service, the bow is slightly inclined towards the rear relative to the direction of travel by reason of the friction between the bow and the overhead contact wire.

Although this type of pantograph has not been completely abandoned, preference is now usually given to bows which have a contact surface of fairly substantial length as measured in the direction of travel. Bows of this type accordingly have freedom of pivotal displacement and thus remain applied against the overhead contact wire even if the height of the wire above the track varies either in the upward or downward direction. It may also be found desirable to employ bows so designed that the surface in contact with the overhead contact wire remains parallel to the ground under all circumstances or in other words does not provide any possibility of oscillation independently of the movable structure.

It is readily apparent that the known device cannot be adapted to either of the two types of bows, although the first type just mentioned is in widespread use.

In point of fact, the operation of the known device would be fairly dangerous if the bow were of the first present-day type mentioned above by reason of the fact that a bow of this type tilts in the forward direction in the event of any reduction in clearance between the overhead contact wire and the track (for example at the entrance of a tunnel). Should the bow then encounter an obstacle on the overhead wire, the bow would first have to pass through the vertical position before tilting towards the rear and finally initiating the downward withdrawal of the pantograph.

Furthermore, the known device is incapable of ensuring the rigid position-maintenance which is necessary for a bow of the second type mentioned in the foregoing.

It is also worthy of note that the known device is highly complex and extremely difficult to adjust on account of the prevailing uncertainty in regard to the friction forces set up by displacement of the cable within its sheath.

Furthermore, the value of the load above which the known device initiates lowering of the pantograph has not been very accurately established. On the contrary, the force exerted in opposition to tilting of the bow increases as this tilting motion takes place by reason of the oppositely-acting springs which become more and more unbalanced and also by reason of the cable restoring spring which is stretched to a progressively greater extent. In addition to the difficult adjustment, it is therefore apparent that, when the bow meets an obstacle, the known device does not remove the stress but causes a progressive increase in stress which may prove dangerous.

The distinctive feature of the invention lies in the fact that the pantograph is provided in addition with a load limiter which inhibits the bow displacement means at a point below a predetermined threshold value of the load applied to the bow and which trips the bow above said threshold value.

Adjustment of the trip load is both very easy and highly reliable since it is only necessary to adjust the load-limiting device.

Once the load limiter permits tilting of the bow under the action of an abnormal load, the force to be overcome in order to cause tilting of the bow is then smaller than a force which was initially opposed by the load limiter.

The device in accordance with the invention is adaptable to a very broad range of different types of current-collector bows and pantographs.

Thus under normal service conditions, the bow can be rigidly maintained with respect to the movable structure if the type of pantograph makes this necessary.

On the other hand, if it is desired to ensure that, in normal service, the bow is capable of tilting freely in order to take up a position at right angles to the overhead contact wire even when the height of this latter above the track either increases or decreases, this is also possible by virtue of an advantageous arrangement of the invention whereby the bow is mounted to rotate freely about a fulcrum with respect to the means provided for producing displacements of the bow.

It can be understood that the pantograph in accordance with the invention overcomes all the disadvantages set forth in the foregoing in regard to the known device.

These and other features of the invention will be more apparent upon consideration of the following description and accompanying drawings, wherein.

Figures 1, 2:
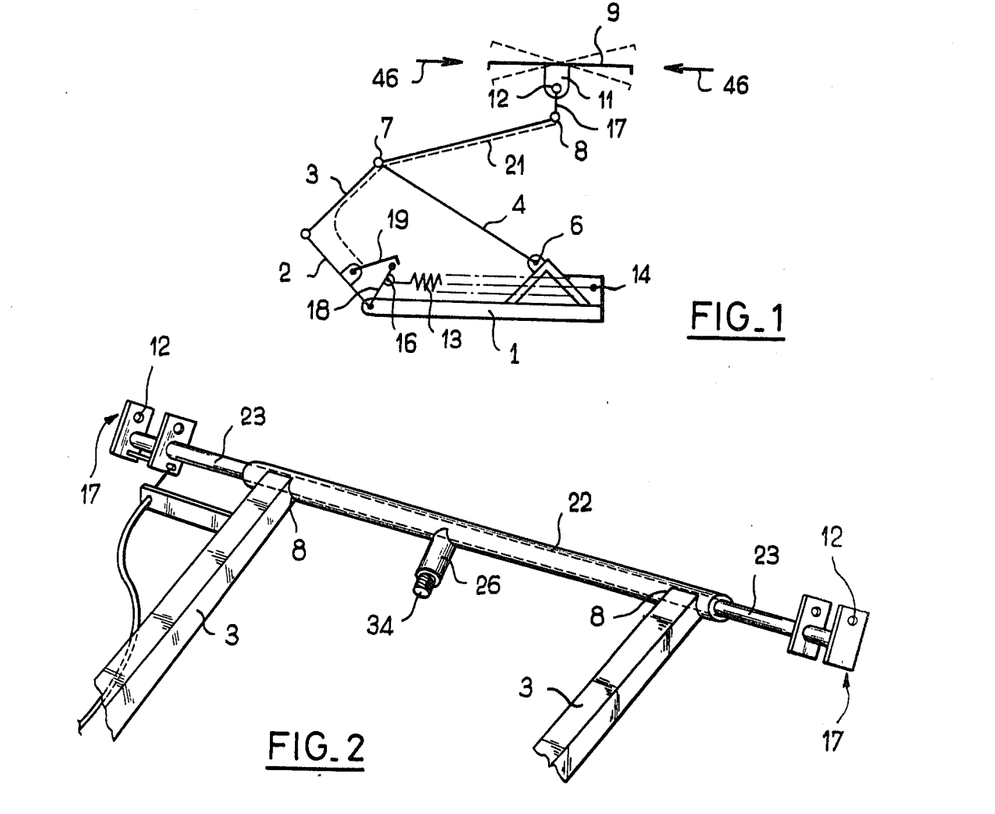
FIG. 1 is a schematic view of a pantograph equipped with the retractable device which is capable of downward withdrawal in the event of a frontal load.
FIG. 2 is a view in perspective showing the top portion of the movable structure of the pantograph of FIG. 1.

As shown in FIG. 1, the pantograph comprises a frame 1, a lower arm 2, one end of which is pivotally attached to said frame 1, and an upper arm 3 pivotally attached to the other end of the lower arm 2.

An angular coupling link 4 which connects a fixed point 6 of the frame 1 to a point 7 at which the upper arm 3 is slightly elbowed in the upward direction has the effect of setting the upper arm 3 in a predetermined angular position in respect of each angle of inclination of the lower arm 2.

The extremity 8 of the upper arm 3 which is remote from the lower arm 2 is fitted with a current-collector bow 9 which is intended to be applied beneath the overhead contact wire (not shown) under operational conditions. The bow 9 is carried by a system 11 which may be constituted, for example, by resilient means having high stiffness for maintaining the bow 9 applied against the overhead contact wire in spite of any small disturbances which it may encounter.

In the pantograph of the type which is designed for ordinary speeds as illustrated in the accompanying drawings, the system 11 is mounted for free rotation with respect to the upper arm 3 by means of a fulcrum 12. It is the upward application of the bow 9 against the overhead contact wire which ensures that the system 11 is mounted in a vertical position. In some cases, a system of stops (not shown in the drawings) serves to limit the pitching or rocking motion of the bow 9 between two extreme positions shown in dashed lines in FIG. 1.

Moreover, a lifting spring 13 attached to the frame 1 at its extremity 14 and joined to the lower arm 2 at its extremity 16 continuously tends to cause expansion of the movable pantograph structure or in other words to produce an upward displacement of the bow 9.

In accordance with the invention, the upper arm 3 is joined to the fulcrum 12 by means for permitting a displacement of the bow 9 independently of and with respect to the upper arm 3. Said means comprise a lever 17 which connects the extremity 8 of the arm 3 to the fulcrum 12 of the system 11. Under conditions of normal service, the lever 17 is approximately perpendicular to the frame 1 but may nevertheless assume a slight inclination either in one direction or in the other according to the degree of expansion of the pantograph.

Furthermore, the pantograph comprises means for neutralizing the action of the lifting spring 13. In the example shown, the extremity 16 of the spring 13 is pivotally attached to a tensioning lever 18 which is in turn pivotally mounted on the frame 1 coaxially with the lower arm 2 but independently of this latter. The free end of the tensioning lever 18 is engaged within a hook 19 which is pivotally attached to the lower arm 2.

Transmission means 21 which will hereinafter be described in greater detail serve to connect the lever 17 to the hook 19 in such a manner as to release the hook 19 from the tensioning lever 18 when the lever 17 moves away from its normal service position.

This structure will now be described in greater detail with reference to FIGS. 2 to 5.

It should first be noted that, in practical forms of construction, certain elements of the movable pantograph structure are double. In this case, the pantograph comprises in particular one lower arm 2, two upper arms 3, two springs 13 and two levers 17 mounted in parallel.

Figures 3, 4:
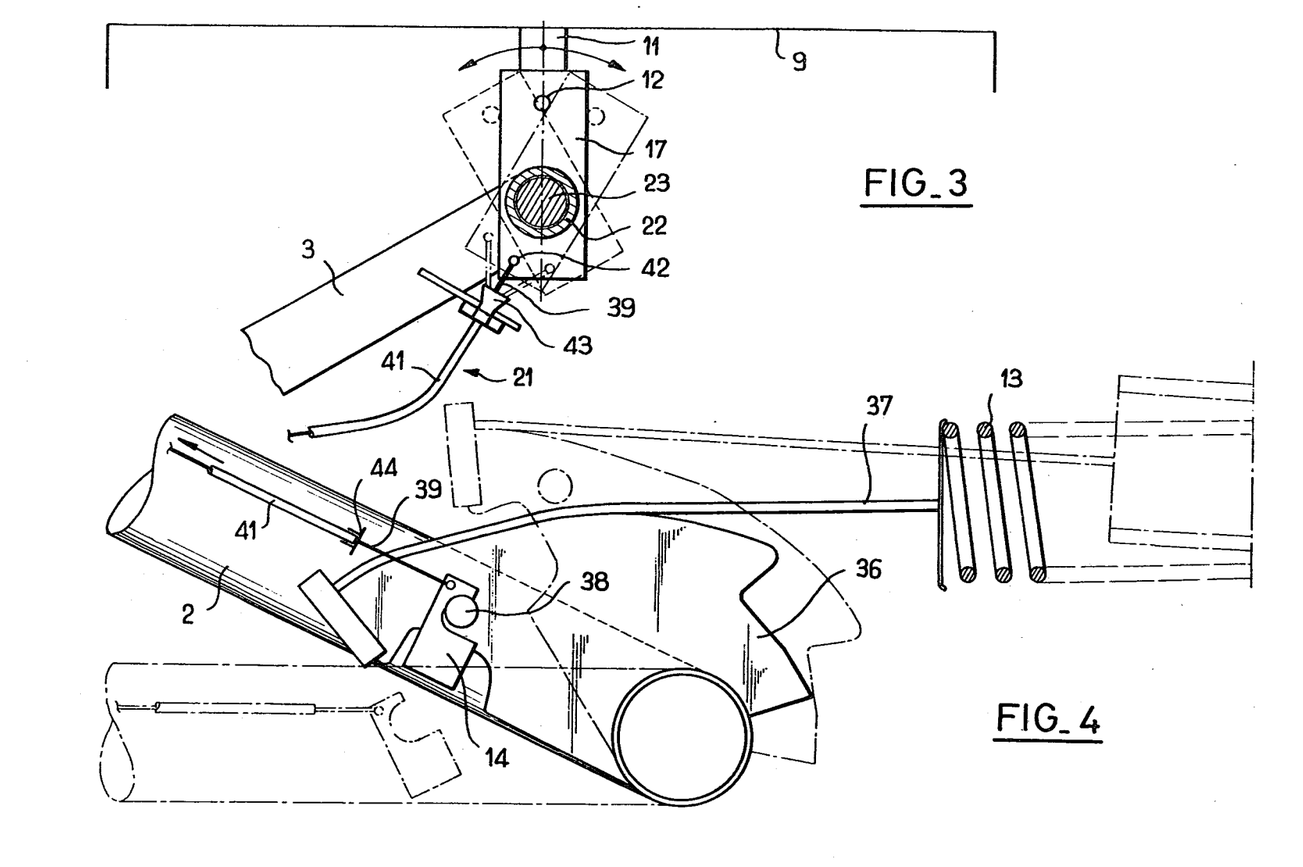
FIGS. 3 and 4 are partial views in side elevation showing respectively the top portion and the base of the pantograph of FIG. 2.

As shown in FIGS. 2 and 3, the extremities 8 of the two upper arms 3 are welded to a transverse tube 22 in which is rotatably mounted a shaft 23 which rigidly carries one of the levers 17 on each side of the tube 22. The levers 17 are designed in the form of yokes and the systems 11 (not shown) are mounted to rotate freely between the arms of said yokes.

The shaft 23 is locked with respect to the tube 22 by means of a load-limiting device 24. As shown in detail in FIG. 5, this device 24 comprises a cylinder 26 having an end-wall in which is pierced an orifice 27 and which is welded opposite to a corresponding orifice 28 of the tube 22. A ball 29 mounted within the orifices 27 and 28 is engaged within a conical recess 31 formed in the shaft 23 opposite to the orifices 27 and 28.

Figure 5:
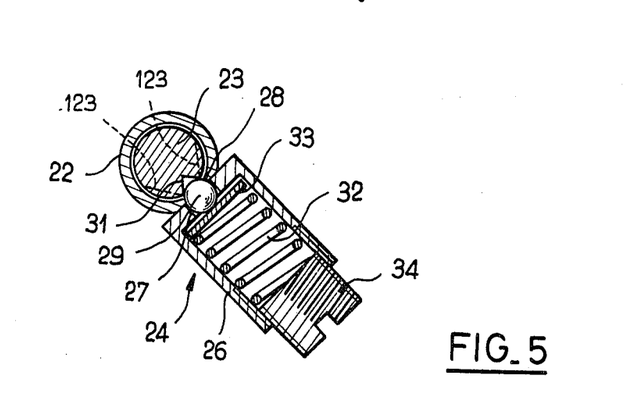
FIG. 5 is a sectional view of the load-limiting device of the pantograph of FIG. 2.

The ball 29 is applied within the conical recess 31 under the action of a helical presser spring 32 and of a bearing washer 33. The spring 32 is applied at the other end against a threaded end-plug 34 which is positionally adjustable within the cylinder 26 by screwing.

At the bottom end of on of the lower arms 2 of the pantograph (as shown in FIG. 4), the tensioning lever 18 of FIG. 1 is replaced by a cam 36 mounted to rotate freely on the frame 1 about the same axis as the lower arms 2.

One of the ends of a sling 37 is attached to the cam 36 whilst the other end is attached to one of the lifting springs 13. By virtue of the profile of the cam 36, the sling 37, which is wound onto the cam 36 to a greater or lesser extent according to the orientation of this latter, transmits the force of the spring 13 to the cam 36 with a leverage effect which decreases progressively as the spring 13 is subjected to higher tension.

Under normal conditions of operation, the articulated hook 14 of the lower arm 2 is engaged with a lug 38 of the cam 36 and consequently couples said cam 36 and the lower arm 2 in rotation.

As shown in FIGS. 2, 3 and 4, the transmission means between the lever 17 and the hook 14 comprise a cable 39 slidably fitted within a sheath 41 which extends along the arms 2 and 3.

One extremity of the cable 39 is pivotally attached at a point 42 of the lever 17 such that the axis of the tube 22 is substantially in the line of extension of said extremity of the cable 39 when this latter is at rest. Thus, when the lever 17 carries out a pivotal movement away from the vertical position, the displacement of the point 42 is perpendicular to the initial direction of the cable 39, with the result that the cable 39 works in tension irrespective of the direction of pivotal displacement of the lever 17. The sheath 41 terminates in a funnel 43 which is secured to the upper arm 3 and prevents wear which would otherwise be caused by friction of the cable 39 under these rather special operating conditions.

The other extremity of the cable 39 is pivotally attached to the hook 14 whereas the corresponding extremity of the sheath 41 is applied against a stop 44 which is secured to the lower arm 2.

As shown in FIG. 2, only one of the levers 17 is coupled to a cable 39 and, as stated earlier, only one of the arms 2 is associated with a cam 36. The other arm 2 is provided with a similar cam which is rigidly fixed thereto.

The pantograph described in the foregoing operates as follows:

Under conditions of normal service, the shaft 23 is rigidly coupled to the tube 22 by means of the load-limiting device 24. The levers 17 therefore have a predetermined position with respect to the upper arms 3.

If the current-collector bow 9 is subjected to a substantial load in the direction of one of the arrows 46 of FIG. 1, the ball 29 withdraws into the cylinder 26 whilst the shaft 23 and the levers 17 undergo a pivotal displacement with respect to the tube 22 and to the upper arms 3. The levers 17 and the cable 39 take up one of their two positions shown in chain-dotted lines in FIG. 3, depending on the direction of the load applied to the bow 9. In either of these two positions, the cable 39 slides within the sheath 41 in the upward direction (towards the top of the pantograph) and the hook 14 withdraws from the lug 38. The cam 36 which is released from the lower arm 2 pivots instantaneously in the direction of release of the spring 13 and takes up the position shown in chain-dotted lines in FIG. 4. The pantograph reverts to the folded state under the action of gravity as also shown in chain-dotted lines in FIG. 4 in the case of the arm 2.

However, since only one of the springs 13 has thus been neutralized, the other spring 13 limits the speed of downward withdrawal of the movable pantograph structure.

Adjustment of the load-threshold trip setting is particularly easy to perform by screwing of the threaded end-plug 34 within the cylinder 36 of the load-limiting device 24. The tripping operation does not cause any damage to the pantograph which can be put back into service as soon as the cam 36 fitted on the lower arm 2 has been re-engaged on this latter.

The invention is also applicable to the socalled "lozenge" pantographs, that is, diamond-shaped pantographs in which two lower arms and two upper arms mounted in symmetrical relation displace the bow in a movement which takes place at right angles to the frame.

Figures 6, 7, 7A, 10:
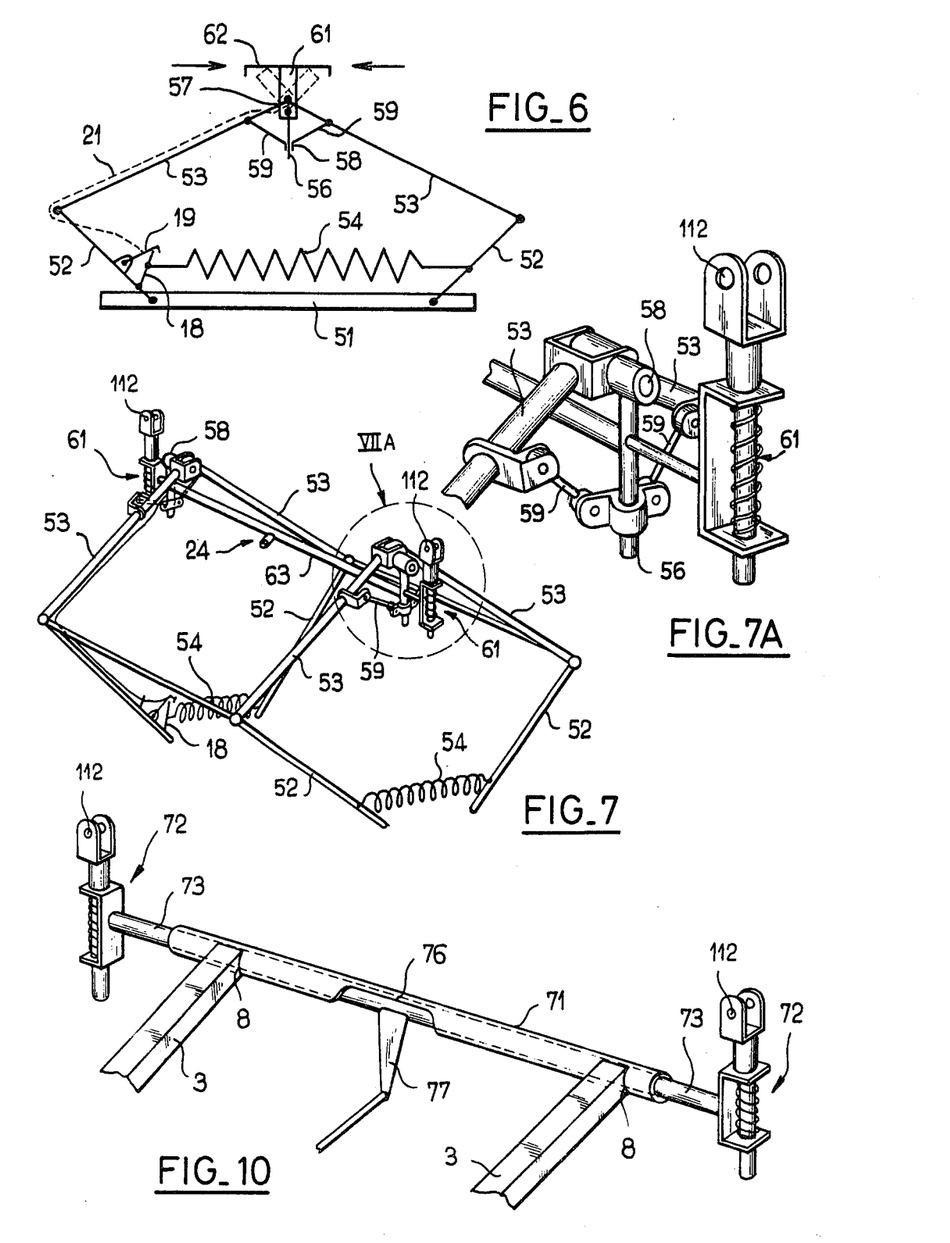
FIG. 6 is a schematic view of a lozenge-shaped pantograph which is capable of downward withdrawal in the event of a frontal load.
FIG. 7 is a schematic view in perspective showing the pantograph of FIG. 6.
FIG. 7A is an enlarged view of the detail designated by the reference VIIA in FIG. 7.
FIG. 10 is a schematic view in perspective showing the head of the pantograph.

As shown in FIG. 6, the lozenge pantograph comprises two lower arms 52 pivotally mounted at one end on a frame 51 and pivotally connected at the other end to two upper arms 53. The two arms 53 are coupled together at the end remote from the arms 52 and each pair of arms 52 and 53 is mounted symmetrically with the other pair in a manner which is similar to the sides of a lozenge.

Means which have not been illustrated in the drawings set the two arms 52 at an angle of slope which is symmetrical with respect to the frame 51.

A lifting spring 54, one end of which is attached to one of the arms 52, continuously tends to cause the movable pantograph structure to open-out in the upward direction. One of the arms 52 is attached to the spring 54 by means of a system which comprises a tensioning lever 18 and a hook 19 and which is similar to the system shown in FIG. 1.

A rod 56 mounted for free pivotal motion on the shaft 57 which serves to couple the two upper arms 53 is maintained substantially perpendicular to the frame 51 by means of a nut 58 which is coupled symmetrically with each arm 53 by means of two articulated connecting-rods 59.

A system 61 which is similar to the system 11 of FIG. 1 serves to couple the bow 62 to the rod 56. The bow 62 is carried by the systems 61 by means of universal-joint assemblies 112 (only the location of which is illustrated) whereby the bow 62 can be applied freely against the overhead contact wire but can also have a certain roll angle as a result of a difference in compression of the springs of the systems 61. In normal service, the system 61 is parallel to the rod 56. Beyond a predetermined applied-load threshold, however, said system 61 is capable of pivotal displacement with respect to the rod 56 to one of the two positions shown in dashed outline. Finally, the transmission means 21 which are similar to those of FIG. 1 serve to couple the system 61 to the hook 19.

Figure 8:
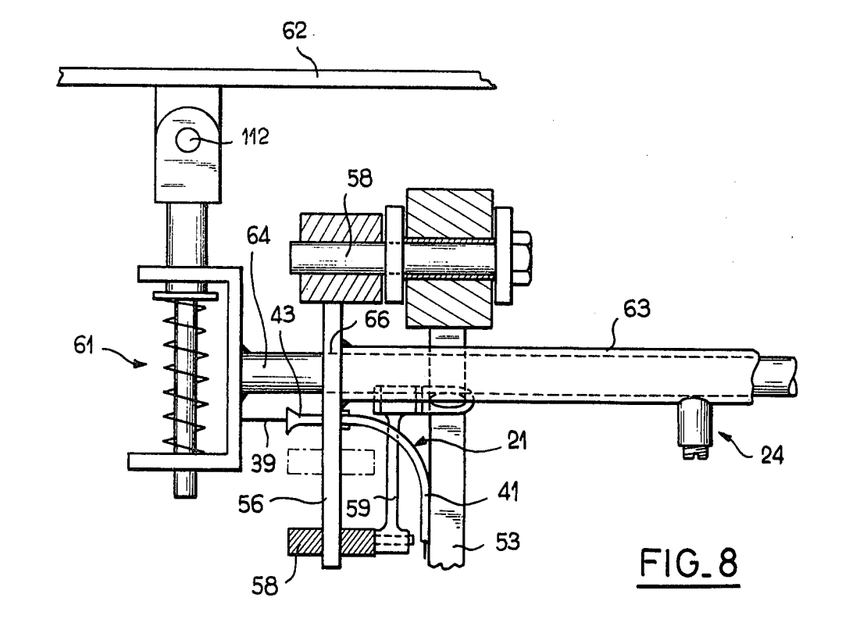
FIG. 8 is a partial front view of the top portion of the movable structure of said pantograph.

This embodiment will now be described in greater detail with reference to FIGS. 7 and 8.

As shown in FIG. 7, the movable structure of the lozenge pantograph is advantageously duplicated as in the case of FIGS. 2 to 5. Among the springs 54, only one of these latter is provided with the arrangements in accordance with the invention which are similar to those of FIGS. 1 to 5 in regard to the springs 54. In consequence, only the top portion of the pantograph will now be described in detail.

The two rods 56 are connected to each other by means of a tube 63 which extends transversely with respect to the pantograph between each pair of upper arms 53 of one and the same lozenge structure. Since the tube 63 endows the upper portion of the pantograph with a sufficient degree of rigidity, the shafts 57 of each lozenge structure are not coupled together.

The resilient systems 61 are also coupled together by means of a shaft 64 rotatably mounted within the tube 63 and within orifices 66 formed in the rods 56 at each end of the tube. Each end portion of the shaft 64 projects beyond the tube 63 and a system 61 is welded at each of these end portions.

The shaft 64 is rotationally coupled to the tube 63 to a partial extent by means of a load-limiting device 24 which is wholly similar in design to the device shown in FIG. 5.

The transmission means again comprise a cable 39 slidably fitted within a sheath 41. The end portion of the cable 39 passes through the rod 56 and the funnel endfitting 43 which is attached to said rod immediately beneath the shaft 64. The cable extremity is attached to the system 61 at a point located opposite to the funnel 43 in the normal service position of the system 61.

The sheath 41 whose funnel end-fitting is abuttingly applied against the rod 56 is secured along the pair of arms 52 and 53 which carries the hook 19.

The operation of this embodiment will now be explained.

Under normal service conditions, the load limiter 24 ensures that the systems 61 are maintained in a vertical position.

Should an abnormal load be applied to the current-collector bow 62, however, the load limiter 24 permits rotational displacement of the shaft 64 and of the systems 61 with respect to the tube 63.

The pivotal displacement just mentioned has the effect of exerting a tractive force on the cable 39 which disengages the hook 19 from the lever 18 and permits expansion of the spring 54.

The pantograph accordingly withdraws downwards to the folded state against it stops without any abrupt displacement by reason of the fact that one of the springs 54 still remains under tension.

In some forms of construction which are similar to the embodiments shown in FIGS. 1 to 5 but are primarily intended to equip vehicles designed to travel at very high speeds, the current-collector bow cannot be applied directly against the overhead contact wire but has to be positioned in a different manner.

Figure 9:
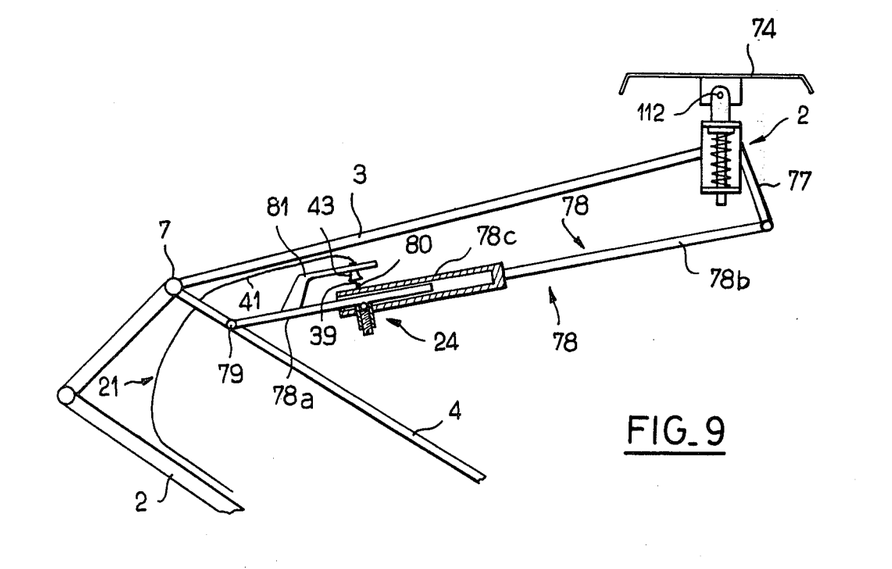
FIG. 9 is a schematic view of a third type of retractable pantograph which is capable of downward withdrawal in the event of a frontal load.

As in FIGS. 2 to 4, the pantograph shown in FIGS. 9 and 10 comprises a lower arm 2 and two upper arms 3 as well as an angular coupling link 4 which is pivotally attached to the frame (not shown) and to a point 7 of the arm 3.

The entire lower portion of the pantograph is similar to that shown in FIGS. 1 to 5 and will therefore be neither described below nor illustrated in the drawings.

The arms 3 are coupled together by means of a tube 71 which is welded transversely to the arm extremities 8. Two resilient systems 72 which are similar to the systems 61 of FIGS. 6 to 8 are each attached to one end of a shaft 73 which is freely rotatable within the tube 71. Both systems carry together a bow 74.

The tube 71 is provided with an elongated slot 76 traversed by a rod 77 welded to the mid-point of the shaft 73 and oriented substantially in the direction opposite to the bow 74. An anti-swing connecting-rod 78 is pivotally attached at one end to the opposite extremity of the rod 77 and at the other end to a point 79 of the link 4 in the vicinity of the point 7.

The anti-swing connecting-rod 78 is constructed in two slidably assembled sections; one section 78a is engaged within the tubular end-piece 78c of the other section 78b.

In normal service, the two sections 78a and 78b are coupled to each other by means of a load-limiting device 24 which is similar to the device of FIG. 5 and mounted on the tubular end-piece 78c.

The transmission means 21 serve to couple the connecting-rod with the lower portion of the pantograph. More specifically, the cable 39 is attached to the tubular end-piece 78c at a point 80 whilst the corresponding extremity of the sheath 41 is abuttingly applied against a bracket 81 fixed to the connecting-rod section 78a and curved in such a manner as to ensure that said sheath 41 terminates opposite to the point 80 when the connecting-rod sections 78a and 78b are coupled together by the load limiter 24.

In this embodiment, any load on the bow 74 is transmitted by the rod 77 to the connecting-rod 78. Above a predetermined threshold value, the load limiter 24 permits relative sliding motion of the connecting-rod sections 78a and 78b and the cable 39 initiates the release of one of the springs of the pantograph.

Figure 11:
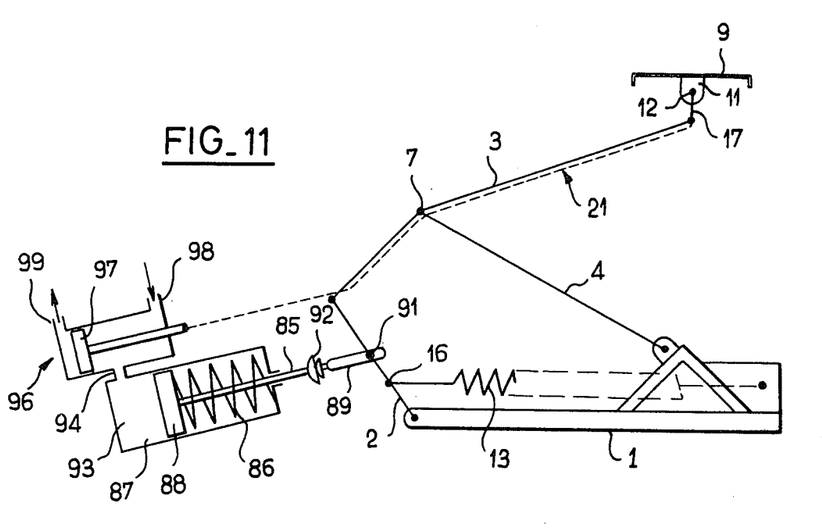
FIG. 11 is a schematic view of a pantograph with a lowering spring counterbalanced by fluid pressure.

The pantograph of FIG. 11 will be described only in regard to the differences between this form of construction and the embodiment of FIG. 1.

The extremity 16 of the spring 13 is attached directly to the arm 2 through the intermediary of a cam.

Moreover, the pantograph comprises a lowering spring 86 mounted within a cylinder 87 between the bottom end of said cylinder and a piston 88. The piston-rod 85 passes axially through the spring 86 and is adapted to carry an elongated slot 89 slidably engaged on a stud 91 of the arm 2. The piston-rod 85 is also provided with an electric insulator 92 which permits attachment of the cylinder 87 to the vehicle without producing an electric short-circuit.

At the end of the piston 88 opposite to the spring 86, the cylinder 87 comprises a chamber 93 for a fluid under pressure, said chamber being provided with an admission port 94.

The port 94 is connected to a central inlet of a valve unit 96 comprising a slide-valve 97 which is coupled to the insulating transmission means 21. The valve unit 96 further comprises a bottom-end admission port 98 for the fluid under pressure, said admission port being located on the same side as the transmission means 21, and a head-end discharge port 99.

When the vehicle is stationary, the spring 86 maintains the pantograph in the folded-back condition in opposition to the action of the spring 13. In order to put the pantograph into service, the admission port 98 of the valve unit 96 is supplied with fluid since the slide-valve 97 is located at the end nearest the discharge port 99. The fluid under pressure passes into the chamber 93, thrusts back the piston 88 and compresses the spring 86, with the result that the spring 13 is permitted to unfold the pantograph. Variations in height of the bow 9 are permitted by means of the elongated slot 89 without modifying the position of the piston 88.

In the event of an abnormal load on the bow 9, the transmission means 21 return the slide-valve 97 in the direction of the admission port 98 and the chamber 93 is put into communication with atmospheric pressure via the discharge port 99. The spring 86 thrusts back the piston 88 and initiates re-folding of the pantograph.

Figure 12:
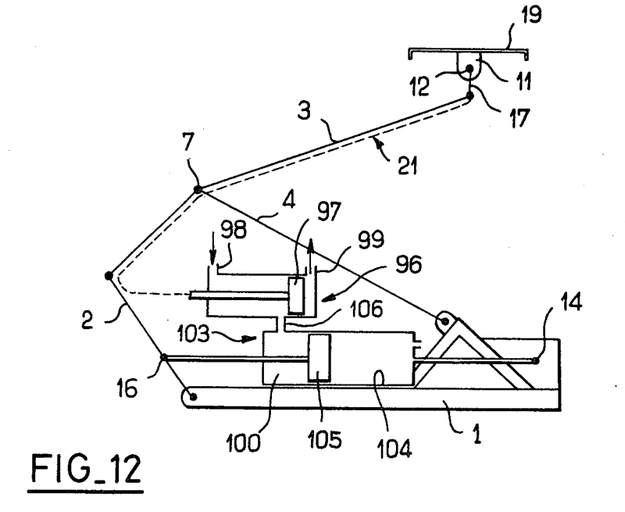
FIG. 12 is a schematic view of a pantograph equipped with a fliud-pressure spring.

The embodiment of FIG. 12 will also be described only in connection with the differences between this latter and the embodiment of FIG. 1.

The lifting spring 13 is replaced by a fluid-pressure spring unit 103 which is mounted directly between the frame 1 and the lower arm 2.

The extremity 14 of the spring unit 103 is connected to the cylinder 104 of said spring unit 103 whilst the extremity 16 of this latter is connected to its piston 105. The chamber 100 of the cylinder 104 is located between said piston 105 and the extremity 16. By means of a port 106, said chamber 100 is permitted to communicate with the central inlet of a valve unit 96 which is identical with the unit of FIG. 11 and the slide-valve 97 of which is also connected to the transmission means 21.

During service, the slide-valve 97 is located at the end nearest the discharge port 99 whilst the fluid under pressure thrusts the piston 105 towards the extremity 14 of the spring unit 103 and tends to cause unfolding of the pantograph.

In the event of an abnormal load on the bow 9, the slide-valve 97 is drawn back towards the admission port 98 of the valve 96 and the cylinder 104 which is connected to the atmosphere permits re-folding of the pantograph.

As will already have been noted throughout the foregoing description, the invention is applicable to an extensive range of different types of pantographs without entailing any need to modify the kinematics or linkages, even after an abnormal load has been applied on the current-collector bow.

The load threshold is independent of the direction of travel of the vehicle and of the height of the bow with respect to the frame and adjustment of the load threshold setting is particularly simple. After an abnormal load, the system ca readily be put back into service, especially in the embodiments of FIGS. 11 and 12 in which it is only necessary to draw the slide-valve 97 back towards the discarge port of the valve unit 96.

As will clearly be understood, the invention is not limited to the examples considered with reference to the accompanying drawings and a large number of alternative arrangements may accordingly be contemplated without thereby departing either from the scope or the spirit of the invention.

Thus, the load limiter can be replaced by a safety shear member such as a calibrated pin which is capable of shearing under the action of a predetermined force.

The invention is also applicable to a pantograph comprising an electric motor for lowering the movable structure in opposition to the action of the spring. It would only be necessary to ensure that the transmission means are connected to a contactor for controlling startup of said motor.

The different alternative forms of construction of means for displacing the bow and neutralizing the action of the springs may be combined with each other in ways which are different from those described and illustrated in the accompanying drawings.

Moreover, the present invention is applicable to very numerous types of pantographs having a wide range of different linkages.

As shown in FIG. 5, a flat face 123 may be formed on each side of the conical recess 31. Thus, once the load threshold has been exceeded and the ball 29 has passed out of the recess 31, the spring 32 may again be permitted to expand, thus assisting the rotation of the shaft 23 within the tube 22 in spite of friction forces. Thus, the load-threshold trip setting cannot become of indefinite value as a result of said friction forces. It would even be possible to form flat faces 123 of substantial size in order to ensure that, after tripping of the pantograph has taken place, the spring 32 is capable of exerting a positive torque on the shaft 23. This accordingly forces the bow to avoid an obstacle without bearing against this latter and accelerates the lowering action on the movable structure.

What is claimed is:

1. A retractable pantograph for automatic downward withdrawal in the event of an abnormal frontal load, comprising a frame, a lifting structure pivotably attached to the frame, a lifting spring connected to the lifting structure for urging a top region of the lifting structure away from the frame, means for connecting a current-collector bow to the top region of the lifting structure, said connecting means including means for permitting displacement of the bow independently of the movable structure, means for neutralizing the lifting spring, additional transmission means for coupling the bow-displacement means to said means for neutralizing the lifting spring, and a load limiter which inhibits the bow-displacement means at point below a predetermined threshold value of the load applied to the bow and which trips said bow with respect to said lifting structure above said threshold value.

2. A pantograph according to claim 1 in which the bow-displacement means comprise at least one lever for coupling the bow to the lifting structure, the transmission means being connected to said lever, wherein the lever is rigidly fixed to a shaft which is locked rotationally on the lifting structure by means of the load limiter.

3. A pantograph according to claim 1 in which the bow is connected to an anti-swing connecting-rod, wherein said connecting-rod comprises two sections slidably mounted with respect to each other and locked in position by means of the load limiter.

4. A pantograph according to claim 1, wherein the load limiter is a latch comprising a spring-controlled ball, means being provided for adjusting the tension of the spring.

5. A pantograph according to claim 4, wherein the ball is engaged in the locking position within a recess of the member to be locked and that there is formed on each side of the recess a shaped surface for permitting progressive expansion of the spring after the ball has passed out of said recess.

6. A pantograph according to claim 1, wherein the means for neutralizing the lifting spring comprise a pivotally-mounted hook engageable with one of the extremities of the lifting spring, the transmission means being connected to said hook.

7. A pantograph according to claim 1 and comprising two lifting springs mounted in parallel, wherein only one of the lifting springs is associated with the means for neutralizing the action of said spring.

* * * * *